April 17, 1951 R. S. GAUGLER 2,548,965
FLUID FILTER
Filed Oct. 3, 1947 2 Sheets-Sheet 2

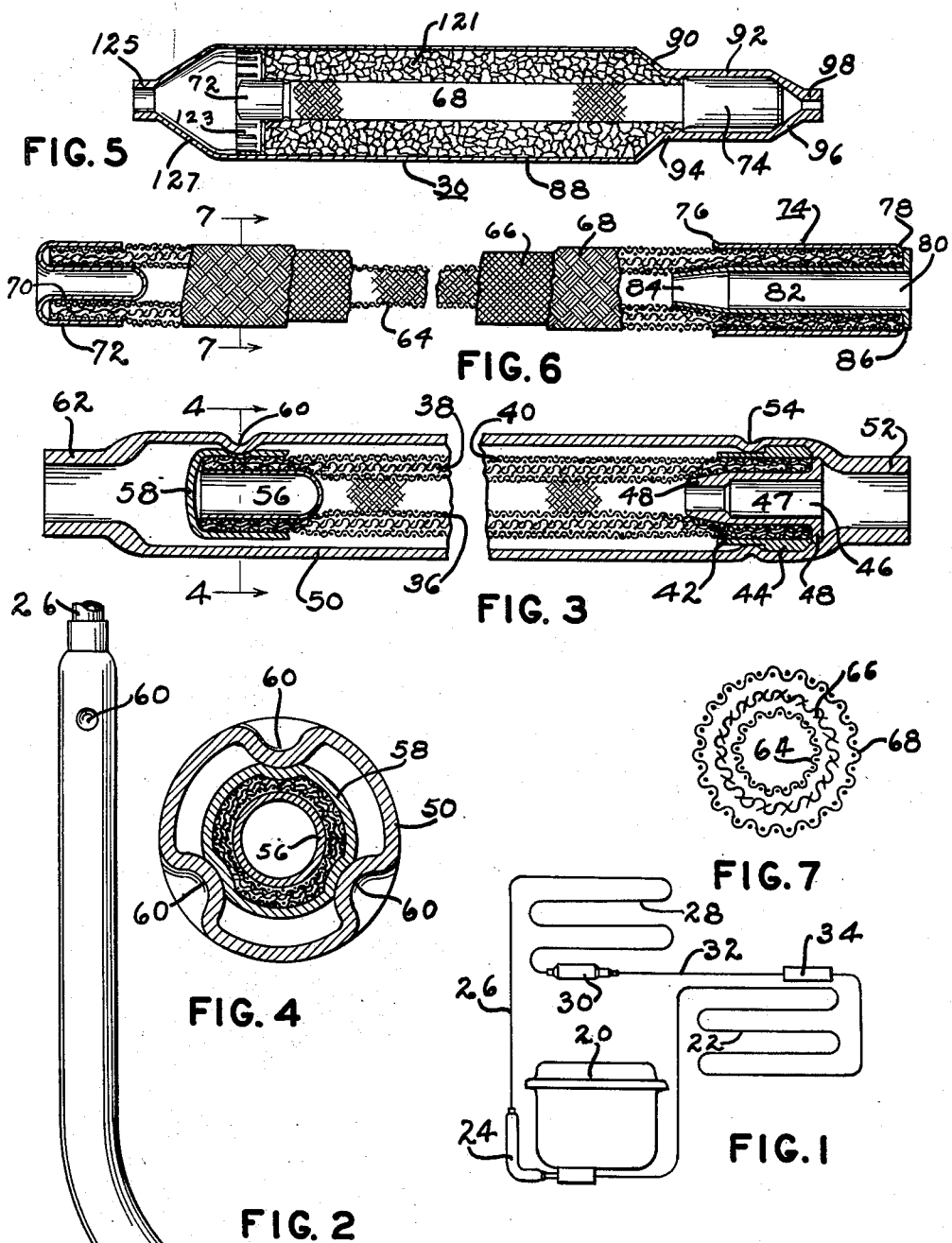

INVENTOR.
Richard S Gaugler
BY
Spencer Hardman and Fehr
attorneys

Patented Apr. 17, 1951

2,548,965

UNITED STATES PATENT OFFICE 2,548,965

FLUID FILTER

Richard S. Gaugler, Dayton, Ohio, assignor to General Motors Corporation, Dayton, Ohio, a corporation of Delaware Application October 3, 1947, Serial No. 777,607

14 Claims. (Cl. 210—164)

This invention relates to structures through which fluid passes such as, for example, filters, driers and mufflers which may be used in a wide variety of applications including refrigerating systems and internal combustion engines.

It is an object of my invention to provide an inexpensive structure containing a pervious member through which fluid passes having a large surface area which does not readily become clogged.

It is another object of my invention to provide an inexpensive structure containing a pervious member through which fluid passes which is self-cleaning.

It is another object of my invention to provide an inexpensive structure containing an inexpensive pervious member through which fluid passes at a low pressure drop.

It is another object of my invention to provide an inexpensive structure containing a flexible pervious member through which fluid passes which can be formed into a wide variety of shapes.

It is another object of my invention to provide an inexpensive filter structure which will withstand rough handling without losing efficiency.

It is another object of my invention to combine efficient drier and filter units into a single structure which is less expensive than separate structures which otherwise might be used for each.

It is another object of my invention to provide an inexpensive muffler from a braided wire sleeve construction.

My improved structure includes a pervious sleeve member located within a tubular element. The sleeve member includes a layer of braided or matted glass fibers held between inner and outer sleeves of braided wire sleeving. The sleeving is closed at one end by pinching or by a suitable cap and at the other end is provided with internal and external collars. The tubular member is deformed at one end to clamp the external collar in place and to seal it with the sleeving to the tubular member. Both ends of the tubular member are provided with arrangements for connecting to inlet and outlet tubing.

In the use of the structure as a muffler the end where the collars are fastened becomes the inlet and the fluid to be muffled is discharged within the interior of the sleeve assembly. When the structure is used as a filter it is preferred to cause the fluid to flow in the reverse direction. When the structure is used as a filter-drier unit the space within the tubular member surrounding the sleeving assembly is filled with a suitable drying material which is held in place by a pervious member adjacent the inlet end of the tubular member which may also be used to hold the cap or closed end of the sleeve member in a central position.

Further objects and advantages of the present invention will be apparent from the following description, reference being had to the accompanying drawings, wherein a preferred form of the present invention is clearly shown.

In the drawings:

Fig. 1 is a diagrammatic view of a refrigerating system showing the use of my improved structure at two separate points in the system, one as a muffler and another as a filter-drier;

Fig. 2 is a full size view of the muffler proper;

Fig. 3 is a fragmentary double size view of the muffler;

Fig. 4 is an enlarged sectional view taken along the lines 4—4 of Fig. 3;

Fig. 5 is a full size sectional view of the filter-drier unit shown in Fig. 1;

Fig. 6 is a fragmentary double size view, partly in section, of the pervious sleeve element shown in Fig. 5;

Fig. 7 is a sectional view taken along the line 7—7 of Fig. 6;

Figure 10:
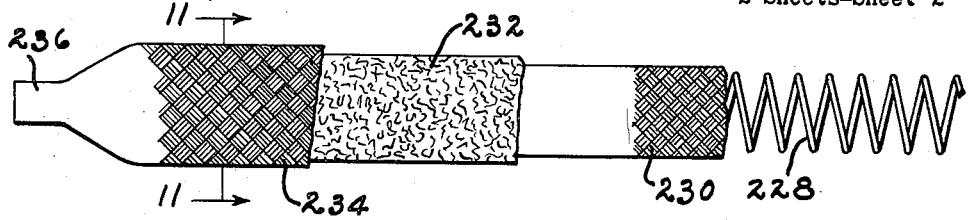
Fig. 10 is an enlarged elevational view showing the construction of the sleeve member.

For the purpose of illustrating two successful applications of my improved structure, there is shown in Fig. 1 a refrigerating system including a sealed motor-compressor unit 20 which withdraws evaporated refrigerant from the evaporator 22 and forwards compressed refrigerant to the muffler 24, which muffles the compressor discharge so as to reduce its noise. From the muffler the compressed refrigerant is conducted through a conduit 26 to the condenser 28 at the outlet 26 to the condenser 28 at the outlet of which is my improved filter-drier unit 30. The filter-drier unit 30 is connected by tubing 32 to a restrictor 34 which controls the flow of liquid refrigerant into the evaporator 22.

Within the muffler 24 there is provided a pervious sleeving assembly including an inner sleeve 36 of multiple braided No. 34 copper or other wire with 5 ends up. Braided tightly over this sleeve 36 is a second sleeve 38 of glass fibers in the form of soft yarn for providing a felted filter bed. Braided tightly around the sleeve 38 is an outer multiple braided wire sleeve 40, preferably of No. 30 copper or other wire with two ends up. However, for the sake of uniformity, No. 34 wire with 5 ends up may be used. At the inlet end, the outer sleeve 40 is surrounded by a collar 42 having a wide flange portion 44. To seal the inlet end of the sleeve assembly of the three braided sleeves there is inserted a tubular plug 46 provided with a tapered nose 48 to permit easy insertion and to force the inlet end of the sleeve assembly outwardly into tight engagement with the collar 44. The plug 46 is provided with a flange 48 which rests upon the inlet end of the collar 44 and this aids in sealing the end of the sleeve assembly. The muffler 24 is provided with a tubular casing 50 of copper or other suitable metal or plastic material having a reduced portion 52 at its inlet end forming an internal shoulder against which the collar 44 and the tubular plug 46 are held by the internal bead 54 which engages the opposite end of the enlarged portion 44 of the collar 42 to hold and seal the inlet end of the sleeve assembly to the walls of the tubular casing 50.

The opposite end of the sleeve assembly is closed by a thimble 56 forced into the inner sleeve 36 and a cap 58 which tightly embraces the outer sleeve 40 so that this end of the sleeve assembly is effectively sealed. The cap 58 is held in a substantially central location relative to the axis of the tubular member 50 by three substantially equal indentations 60 which extend into contact with the cap 58 to hold it in place, as shown in Fig. 4. The compressed gas enters through the inlet end 52 and passes through the axial opening 47 in the tubular plug 46 to the interior of the inner sleeve 36. The braided wire sleeve provides a dead surface insofar as its noise absorbing properties are concerned, and thence passes through the three sleeves to the space surrounding them within the tubular casing 50. Thence the gas passes through the outlet connection 62 which connects to the conduit or tube 26. While I have described the sleeves as made of wire and glass fiber it is possible to use other textiles of natural or synthetic origin. If less restriction is desired, the cap 58 and the thimble 56 may be omitted.

Figure 11:
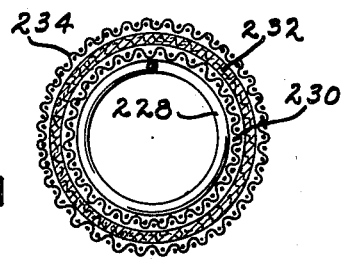
Fig. 11 is an enlarged sectional view taken along the line 11—11 of Fig. 10.

The filter-drier unit 30 likewise includes a pervious sleeving assembly including an inner sleeve 64 of multiple braided No. 34 copper wire with 5 ends up surrounded by a braided sleeve 66 of glass fibers spun into soft yarn and braided tightly thereon. Braided tightly over the sleeve 66 is an outer multiple braided sleeve 68 of No. 30 copper wire with 2 ends up. In both the muffler 24 and the filter-drier unit 30 the inner and outer braided wire sleeves, such as the sleeves 64 and 68, hold the braided wire sleeve 66 of glass slivers spun into thread between them and through their greater stiffness and structural strength hold the sleeving substantially in a tubular shape and resists collapsing. By using multiple braided wire sleeving with 5 ends up, the inner sleeve has sufficient structural strength to resist collapsing. To provide greater porosity, it is preferred to use braiding with 2 ends up for the outer sleeve although for the sake of uniformity it may be the same as the inner sleeve. However, the braided wire sleeving is sufficiently flexible to substantially hold its shape when bent as in the case of the muffler 24 and this makes it possible to adapt the construction to a wide variety of shapes and sizes. The sleeving may be made of other materials of natural or synthetic origin which may be formed into yarn. If wire sleeving is not used or if the wire sleeving does not have sufficient structural strength the sleeving may be reinforced by an internal coil of wire, as illustrated in Figs. 10 and 11. However, for the sizes which would be used in most applications, such as refrigerating systems and internal combustion engines, it appears that such reinforcement is unnecessary.

The two ends of the element, however, are reinforced. The closed end is reinforced by a structure which includes an integral inner thimble 70 which is forced within the inner sleeve 64 and is connected to an outer flange 72 which is spun over the outer sleeve 68 so that the single member serves the same purpose as the separate thimble and cap 56 and 58 shown in Fig. 3. This unitary construction closes the end of the inner sleeving and the adjacent end of all of the sleeves and serves as a structural reinforcement to prevent the flattening and possible unravelling of the sleeving.

The opposite end of the sleeving is reinforced by a thin collar 74 provided with an outturned reinforcing flange 76 at one end, which also aids in slipping the collar over the outer sleeve 68 and an inturned flange 78 directly at the end of the outer sleeve 68. Within the inner sleeve 64 there is forced a flanged hollow plug 80 containing a passage 82 and a tapered nose 84 which when inserted, forces the inner sleeve 64 and the sleeve 66 outwardly, firmly into contact with the outer sleeve which is thereby firmly pressed into contact with the interior of the collar. The flange 86 of this plug contacts the inturned flange 78 and so effectively closes the ends of the braided sleeves.

The pervious sleeving assembly is housed in a tubular casing 88 provided with a frusto-conical shoulder 90 which reduces the diameter from the large diameter of the central portion to a smaller cylindrical portion 92. Within the cylindrical portion adjacent the frusto-conical shoulder there is provided an internal bead or shoulder 94 against which rests the flange 76 of the collar 74. The plug 80 is held in place within the collar 74 and the collar 74 is held in place by the frusto-conical shoulder 96 which is put onto the end of the tubular member 88 to provide a reduced diameter connecting portion 98 for connection to the small conduit 32 substantially of capillary size.

Within the tubular member 88 surrounding the outer sleeve 68, to add to the unit the function of a drier, there is provided a granular drying material or desiccant 121. This granular drier material may be of any suitable type, but I prefer to use anhydrous calcium sulphate coated with cellulose acetate or other hygroscopic coating, as described in the Cook and Waring Patent No. 2,388,390, issued November 6, 1945. However, if desired other drying materials, such as ordinary granular anhydrous calcium sulphate or silica gel, or activated charcoal or alumina may be used, if desired. The granular drying material 121 is held in place by a pervious metal member 123 having an outer flange or rim which fits against the inner walls of the tubular casing 88 and is serrated to provide spring fingers which spring outwardly against the walls of the tubular casing 88 to hold the member 123 in place. The central portion of the member 123 is provided with an aperture just large enough to receive the flange portion 72 of the cap member for holding the cap member substantially concentric with the axis of the tubular member 88.

The member 123 surrounding this aperture is serrated so that fluid which enters the filter-drier through the inlet 125 can pass into the drying material 121. Should the refrigerant contain any moisture it will be absorbed by the drying material 121. After passing through the drying material 121 the liquid refrigerant will flow through the pervious braided sleeves to the interior of the inner sleeve 64 and then pass through the passage 82 in the tubular plug 80 to the capillary conduit 32. The outer sleeve 68 prevents the passage of any large particles which may be circulating with the refrigerant in the system and prevents those large particles from clogging the middle layer of fibrous sleeving 66. The outer sleeving 68 has a large surface area so that it does not readily clog to any great extent. Furthermore it has self-cleaning properties and during idle periods of the system the particles tend to fall from the surface of the outer sleeve 68. The very fine particles are filtered out of the liquid refrigerant and held by the middle layer of braided sleeving 66. The middle sleeve is prevented from becoming clogged by the fact that the outer sleeve 68 catches the larger particles. The tubular casing 88 is closed with a frusto-conical shoulder 127 between the full diameter portion and the reduced diameter inlet portion 125.

Figure 9:
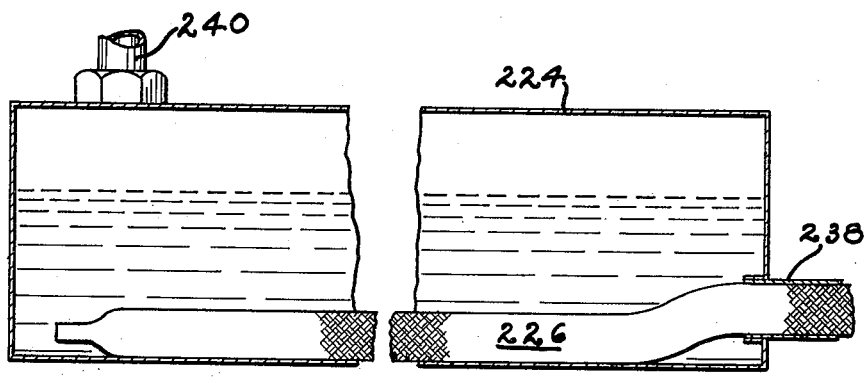
Fig. 9 is a sectional view of the receiver of the refrigerating system shown in Fig. 8 illustrating the pervious sleeve member therein.
Figure 8:
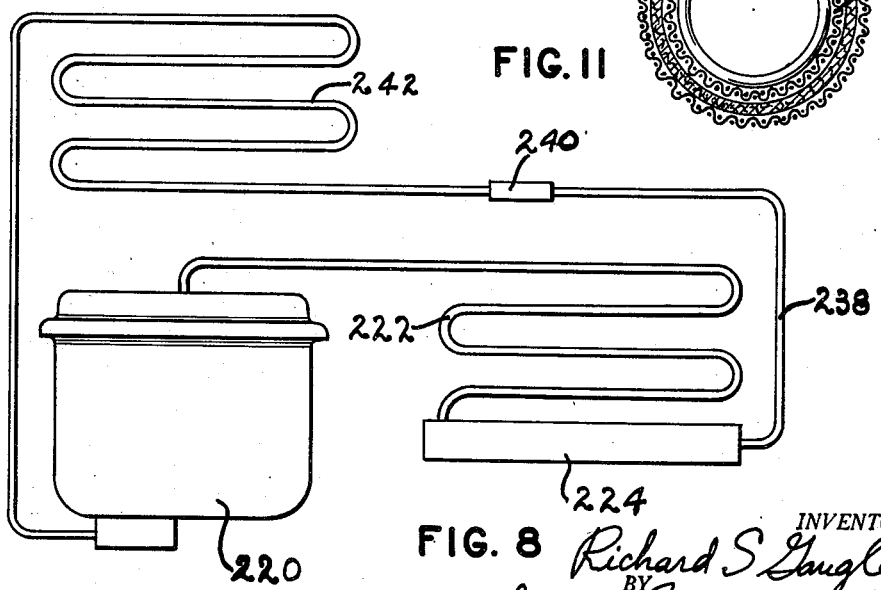
Fig. 8 is a diagrammatic view of a refrigerating system illustrating a modified form of the invention.

In Figs. 8 to 11 no special casing is provided; but the casing of one of the elements in the refrigeration system is made use of. In Fig. 8 there is shown a motor-compressor unit 220 connected directly to a condenser 222 which drains into a receiver 224. Within the receiver 224, which is used to store a surplus of condensed refrigerant, I place my pervious sleeve assembly 226, as shown in Fig. 9. As shown in Fig. 10, this sleeve assembly is provided with an inner core of helically coiled wire 228 over which is braided an inner sleeve of copper or other wire 230 of suitable fineness. For example, No. 35 copper or steel wire may be used. Tightly enclosing this inner sleeve 230 is a layer of glass fibers 232 which preferably is in the form of glass sliver; that is, untwisted carded glass fiber. These glass fibers may be applied by winding one or more ribbons of glass sliver in the same or opposite directions as the inner sleeve 230 is being braided. Other methods of applying the glass fibers may be used, if desired. Of course there also may be substituted a braided sleeving similar to the sleeve 66 of glass fibers formed into thread or matted fibers, for example metal fibers, such as steel wool or textile fibers, such as cotton or animal wool, or inorganic fibers, such as rock wool, to make the felted filter bed.

Over the sleeving 232 is applied an outer braided wire sleeve 234 of copper or other wire. One end of the sleeve assembly is closed by flattening, as indicated by the reference character 236. However, other means for closing the end may be used. The opposite end of the sleeving assembly is fitted tightly within the liquid outlet tube 238. Whenever the inner sleeve 230 has sufficient structural strength, it is possible to omit the inner core of helically coiled wire 228.

The liquid from the condenser 222 enters through the inlet opening 240 in the top of the receiver 224. The liquid then flows through the three pervious sleeves in the assembly 226 to the interior of the inner sleeve 230 from which the liquid flows to the liquid conduit 238 forming the outlet of the receiver. The coarse particles are caught by the outer sleeve 234 which is self-cleaning and from which the particles fall during idle periods of the refrigerating system. The remaining extremely fine particles which pass through the outer sleeve 234 are caught by the layer of glass fibers 232. In this way the compressor is protected from foreign particles which may be circulating with the refrigerant in the system and clogging of the restrictor is prevented. The liquid conduit 238 connects to the restrictor 240 which controls the flow of liquid refrigerant in the evaporator 242 where the liquid refrigerant evaporates and is returned to the compressor 220.

The pervious sleeve elements which are used both as a muffler and as a filter are relatively inexpensive since they can be made on existing high speed wire braiding machines which already have been highly developed for covering insulated electric wire. Preferably the inner braided wire sleeve is first formed either over the inner coiled wire core 228 or preferably without such a core. The second or middle sleeve which is preferably formed of glass fibers is then wrapped or braided or applied in some other manner directly over the inner braided wire sleeve as it is being formed. The outer braided wire sleeve may be braided directly over the second or middle sleeve immediately after the second has been applied to the inner braided wire sleeve. The three operations go on continuously and the completed filter sleeving is fed directly from the braiding machine. Such braiding machines have been highly developed for covering insulated wire.

This filter sleeving may then be cut to required lengths and the ends treated as described. The tubular casings may be readily formed with rapidity through the use of simple tools. The removal of moisture and particles from the system increases the life of the system and improves its operation and efficiency. The removal of particles from the lubricant and fuel in internal combustion engines also lengthens the life, reduces wear and promotes efficiency. This new filter construction makes it possible to provide filters and driers in places where the higher cost of other filters and driers have prevented their use.

While the form of embodiment of the invention as herein disclosed, constitutes a preferred form, it is to be understood that other forms might be adopted, as may come within the scope of the claims which follow.

What is claimed is as follows:

1. A structure through which fluids are passed including an inner pervious braided wire sleeve, a pervious layer of fibrous material surrounding the inner sleeve, an outer pervious braided wire sleeve in the form of an axially extending continuously braided envelope surrounding and retaining the layer of fibrous material, said sleeves having their braided sleeve formation coaxially arranged relative to each other and the layer of fibrous material, an impervious one-piece casing enclosing the sleeves, said casing having inlet and outlet openings, one end of the outer sleeve being sealed to said outlet opening, the opposite end of the inner sleeve being closed.

2. A structure through which fluids are passed including an inner pervious braided wire sleeve, a pervious sleeve of braided fibrous material completely surrounding the inner sleeve, an outer pervious braided wire sleeve in the form of an axially extending continuously braided envelope completely surrounding the sleeve of braided fibrous material, said sleeves having their braided sleeve formation coaxially arranged relative to each other and the layer of fibrous material, one end of the inner sleeve being closed.

3. A structure through which fluids are passed including an inner pervious braided wire sleeve, a pervious layer of fibrous material completely surrounding the inner sleeve, an outer pervious braided wire sleeve completely surrounding the layer of fibrous material, a strong substantially rigid tubular member extending within one end of the inner sleeve, an impervious one-piece thin walled casing enclosing the sleeves, said casing having inlet and outlet openings, the end of the outer sleeve surrounding the tubular member being held tightly within the casing immediately adjacent one of said openings and sealed therein, the other end of the inner sleeve member being closed.

4. A structure through which fluids are passed including an inner pervious braided wire sleeve, a pervious layer of fibrous material completely surrounding the inner sleeve, an outer pervious braided wire sleeve completely surrounding the layer of fibrous material, a strong substantially rigid tubular member extending within one end of the inner sleeve, an impervious one-piece thin walled casing enclosing the sleeves, said casing having integral inlet and outlet openings, a stiff collar extending around and tightly fitting that portion of the outer sleeve surrounding said tubular member, said stiff collar lodged within and fitting tightly within the casing immediately adjacent one of said openings, the other end of the inner sleeve being closed.

5. A structure through which fluids are passed including an inner pervious braided wire sleeve, a pervious layer of fibrous material completely surrounding the inner sleeve, an outer pervious braided wire sleeve completely surrounding the layer of fibrous material, a strong substantially rigid tubular member extending within one end of the inner sleeve, an impervious one-piece thin walled casing enclosing the sleeves, said casing having integral inlet and outlet openings, the end of the outer sleeve directly surrounding the tubular member being held tightly within the casing immediately adjacent said outlet opening and sealed therein, the other end of the inner sleeve member being closed, said tubular member having a tapered nose extending into the inner sleeve.

6. A structure through which fluids are passed including an inner pervious braided wire sleeve, a pervious layer of fibrous material completely surrounding the inner sleeve, an outer pervious braided wire sleeve completely surrounding the layer of fibrous material, an impervious one-piece thin walled casing enclosing the sleeves, said casing having an integral necked-down portion closely enclosing one end of the outer sleeve, said one end of the outer sleeve being lodged and sealed within said necked down portion.

7. A structure through which fluids are passed including an inner pervious braided wire sleeve, a pervious layer of fibrous material completely surrounding the inner sleeve, an outer pervious braided wire sleeve completely surrounding the layer of fibrous material, an impervious one-piece thin walled casing enclosing the sleeves, said casing having an integral necked-down portion closely enclosing one end of the outer sleeve, said one end of the outer sleeve being lodged and sealed within said necked down portion, the opposite end of the inner sleeve being closed, a granular moisture absorbing substance lodged within the casing surrounding the outer sleeve, and a pervious means located in the end of the casing opposite the necked down portion for holding said substance in the casing.

8. A structure through which fluids are passed including an inner pervious braided wire sleeve, a pervious layer of fibrous material completely surrounding the inner sleeve, an outer pervious braided wire sleeve completely surrounding the layer of fibrous material, an impervious one-piece casing enclosing the sleeves, said casing having inlet and outlet openings, one end of the outer sleeve being sealed to said outlet opening, the opposite end of the inner sleeve being closed, a granular moisture absorbing material within said casing surrounding the outer sleeve, and a pervious means located in the end of the casing opposite that where the outer sleeve is sealed to one of said openings for holding the substance in the casing.

9. A structure through which fluids are passed including an inner pervious braided wire sleeve, a pervious layer of fibrous material completely surrounding the inner sleeve, an outer pervious braided wire sleeve completely surrounding the layer of fibrous material, an impervious casing enclosing the sleeves, said casing having inlet and outlet openings, one end of the outer sleeve being sealed to one of said openings, the opposite end of the inner sleeve being closed, a granular moisture absorbing material within said casing surrounding the outer sleeve, and a pervious means located in the end of the casing opposite that where the outer sleeve is sealed to one of said openings for holding the substance in the casing, said pervious means having an aperture receiving the adjacent end of the outer sleeve to hold it in place away from the walls of the casing.

10. A structure through which fluids are passed including a pervious sleeve means closed at one end and provided with a substantially rigid collar at the opposite end, a one-piece thin walled casing enclosing said pervious sleeve means and having at one end portion an integral locking shoulder, said rigid collar being located between said locking shoulder and the adjacent end of the one-piece casing, the adjacent integral end portion of the casing beyond the collar being reduced in size below that of the collar to lock the collar in the end portion of the casing, said pervious sleeve means extending from said collar into the interior of the casing, the opposite end of the casing being indented at a plurality of uniformly spaced points into contact with the sleeve means to hold the sleeve means substantially central relative to the cylindrical portions of the walls of the casing.

11. A structure through which fluids are passed including a pervious sleeve means closed at one end and provided with a substantially rigid collar at the other end, a tubular casing enclosing said sleeve means, said collar being sealed to said casing adjacent one end of said tubular means, a metal member within said casing having an outer flange provided with spring fingers bearing against the inner surface of said casing and having in its central portion an aperture through which the sleeve means projects, the edges of said aperture extending substantially into contact with said sleeve means.

12. A structure through which fluids are passed including a pervious sleeve means closed at one end and provided with a substantially rigid collar at the opposite end, a one-piece thin walled casing enclosing said pervious sleeve means and having at one end portion an integral locking shoulder forming an integral part of the wall of the casing, said rigid collar being located between said locking shoulder and the adjacent integral end wall of the one-piece casing, the adjacent integral end portion of the wall of the casing beyond the collar being reduced in size below that of the collar to lock the collar in the end portion of the casing, said pervious sleeve means extending from said collar into the interior of the casing.

13. A structure through which fluids are passed including a pervious sleeve means closed at one end and provided with a substantially rigid collar at the other end, a one-piece thin walled tubular casing enclosing said sleeve means and having one end portion provided with a hollow frusto-conical internal and external shaped surfaces flanked by a hollow internal and external cylindrical surfaced wall portion of smaller diameter than the major portion of the casing, said casing being provided with an integral internal shoulder adjacent the junction of the frusto-conical shaped surfaces and the cylindrical portion, said collar being located within said hollow cylindrical portion and held by said internal shoulder, both ends of said casing being provided with internal and external surfaces in the form of internal and external frusto-conical shoulders flanked by short, hollow cylindrical portions to provide a connection to small tubing.

14. A structure through which fluids are passed including an inner pervious braided wire sleeve, a pervious layer of fibrous material surrounding the inner sleeve, an outer pervious braided wire sleeve surrounding and retaining the layer of fibrous material, an impervious one-piece thin-walled casing enclosing the sleeves, said casing having aligned inlet and outlet openings, one end of the outer sleeve being held tightly within one end of the casing immediately adjacent one of said openings and opening directly into said one opening, the other end of the inner sleeve member being closed.

RICHARD S. GAUGLER.

REFERENCES CITED

The following references are of record in the file of this patent:

UNITED STATES PATENTS

| Number | Name | Date |
|---|---|---|
| 629,377 | Leland | July 25, 1899 |
| 633,368 | Riddick, Jr. | Sept. 19, 1899 |
| 1,015,311 | Gold | Jan. 23, 1912 |
| 1,199,628 | Stauffer | Sept. 26, 1916 |
| 1,218,848 | Foster | Mar. 13, 1917 |
| 1,229,437 | Foster | June 12, 1917 |
| 1,620,114 | Loughead | Mar. 8, 1927 |
| 1,645,367 | Weaver | Oct. 11, 1927 |
| 1,814,572 | Shaffer | July 14, 1931 |
| 1,839,350 | Slagel | Jan. 5, 1932 |
| 1,872,540 | White | Aug. 16, 1932 |
| 1,925,901 | Leguillon | Sept. 5, 1933 |
| 1,973,756 | Gish | Sept. 18, 1934 |
| 2,021,452 | Kuenzli et al. | Nov. 19, 1935 |
| 2,035,758 | Pierce | Mar. 31, 1936 |
| 2,113,923 | Miller | Apr. 12, 1938 |
| 2,134,730 | Osborn | Nov. 1, 1938 |
| 2,199,258 | Gray | Apr. 30, 1940 |
| 2,218,339 | Manning | Oct. 15, 1940 |
| 2,225,990 | Henry | Dec. 24, 1940 |
| 2,238,058 | Johnson et al. | Apr. 15, 1941 |
| 2,283,989 | Henry | May 26, 1942 |
| 2,325,657 | Burkness | Aug. 3, 1943 |
| 2,369,740 | Johnson et al. | Feb. 20, 1945 |
| 2,421,329 | Hoffer | May 27, 1947 |
| 2,453,952 | White | Nov. 16, 1948 |